United States Patent [19]
Rao

[11] Patent Number: 5,173,946
[45] Date of Patent: Dec. 22, 1992

[54] CORNER-BASED IMAGE MATCHING

[75] Inventor: Kashipati G. Rao, Dallas, Tex.

[73] Assignee: Texas Instruments Incorporated, Dallas, Tex.

[21] Appl. No.: 708,592

[22] Filed: May 31, 1991

[51] Int. Cl.$^5$ .............................................. G06K 9/46
[52] U.S. Cl. ......................................... 382/22; 382/8
[58] Field of Search ............... 382/8, 21, 22; 364/559; 358/101, 107

[56] References Cited

U.S. PATENT DOCUMENTS 4,479,145 10/1984 Azuma et al. ....................... 358/107
4,630,225 12/1986 Hisano ..................................... 382/8

OTHER PUBLICATIONS

Borgefors, "Distance Transformations in Digital Images", National Defence Research Institute of Sweden, reprint from Computer Vision, Graphics, and Image Processing, vol. 34 pp. 344–371, 1986.

Barrow, Tenenbaum, Bolles and Wolf, "Parametric Correspondence and Chamfer Matching: Two New Techniques for Image Matching", SRI International, Menlo Park, Calif., publication date unknown.

Primary Examiner—Leo H. Boudreau
Attorney, Agent, or Firm—L. Joy Griebenow; William E. Hiller; Richard L. Donaldson

[57] ABSTRACT

An image matching method that uses corners of objects, rather than their edges, to determine if the objects match. Corner locations are obtained by finding changes of curvature in the edge boundaries of the image. The corners of a reference image are used to create a distance array, which is used as a look-up table to determine how far each corner of a test array is from a corresponding corner of the reference array. A close corner-to-corner relationship indicates a good match.

17 Claims, 4 Drawing Sheets

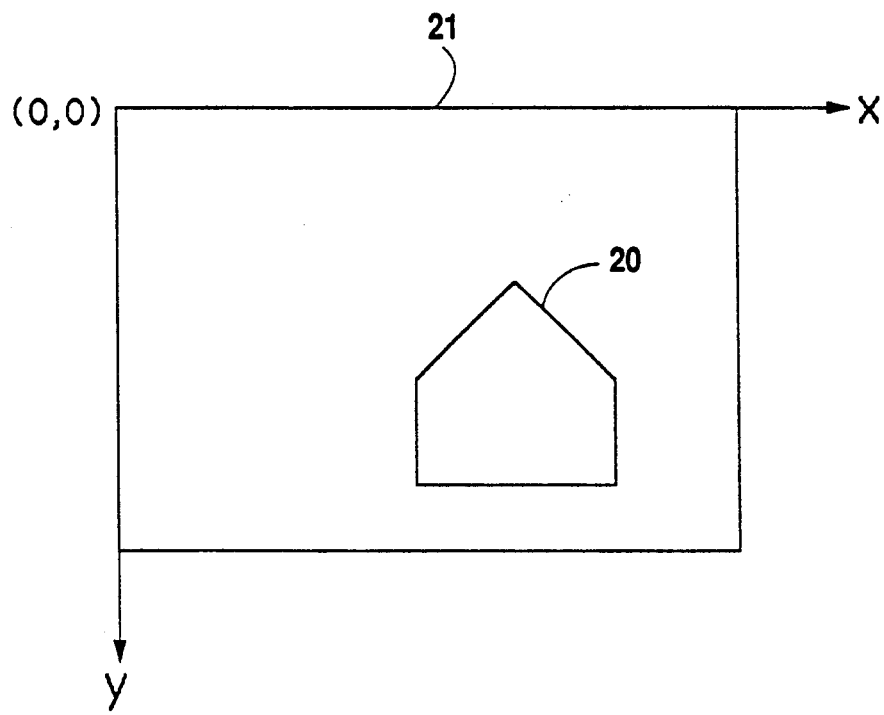

CORNER-BASED IMAGE MATCHING

TECHNICAL FIELD OF THE INVENTION

This invention relates to digital image processing, and more particularly to using a computer to match an image to a reference image.

BACKGROUND OF THE INVENTION

Computer vision may be defined as the automation of processes used to construct meaningful descriptions of physical objects from images. Many computer vision applications require the ability to match a test image to a reference image. In general, matching establishes an interpretation of input data, where an interpretation is the correspondence between models represented in the computer and the external world of objects. Examples of such applications include vehicle guidance systems, object recognition, stereo vision, and motion following.

Various matching techniques are used, including those that match parameters of a reference model and those that match geometric shapes. Of the latter techniques, many shape matching techniques are similar, in that they define the best match as the one that minimizes a measure of disagreement.

A recent shape matching technique, designed to reduce computational cost, is "chamfer matching". Chamfer matching compares shapes by calculating distances between curve fragments of the test image and curve fragments of the reference image.

A basic step in the chamfer matching process is obtaining a distance array of a reference image. This distance array is obtained from a feature array, in which image features are extracted by applying edge operators. Each element of the feature array records whether or not a line passes through it. The feature array is then transformed into a distance array, which is an array of numbers representing distances to the nearest feature point.

To match a test image to a reference image, the distance array is used as a look-up table to obtain the distance between each feature point of the test image and the nearest feature point of the reference image. These distance values are summed, and a small sum indicates a good match.

Although chamfer matching has been successful in reducing computational cost, the process of obtaining and matching edges requires numerous point calculations along each edge. A need exists for a method of matching images that uses less computational time and fewer resources.

SUMMARY OF THE INVENTION

One aspect of the invention is a method of matching a test image to a reference image. A reference image is obtained and its edge boundaries are determined. From the edge boundaries, the corners are determined. These corners are used to calculate a distance array, which represents distances of each array location to the nearest corner. The test image to be matched is then obtained, and its edge boundaries determined. From the test image edge boundaries, the corners are determined. For each corner, the distance array is used to determine the distance of each corner of the test image from a corner of the reference image. These distances are evaluated, with the smallest distances representing the best per corner match. If the distances are summed, the smallest sum represents the best overall match.

A technical advantage of the invention is that it provides an image matching method that requires less computational effort than conventional methods. The method is more efficient in terms of time and memory, and produces results comparable with other chamfer matching methods.

BRIEF DESCRIPTION OF THE DRAWINGS

FIG. 2 illustrates a simple reference image in an image frame.

FIG. 3 is an edge feature image of the reference image of FIG. 2.

FIG. 4 illustrates a corner array.

FIG. 5 illustrates an example of a distance array generated in accordance with the invention.

DETAILED DESCRIPTION OF THE INVENTION

Figure 1:
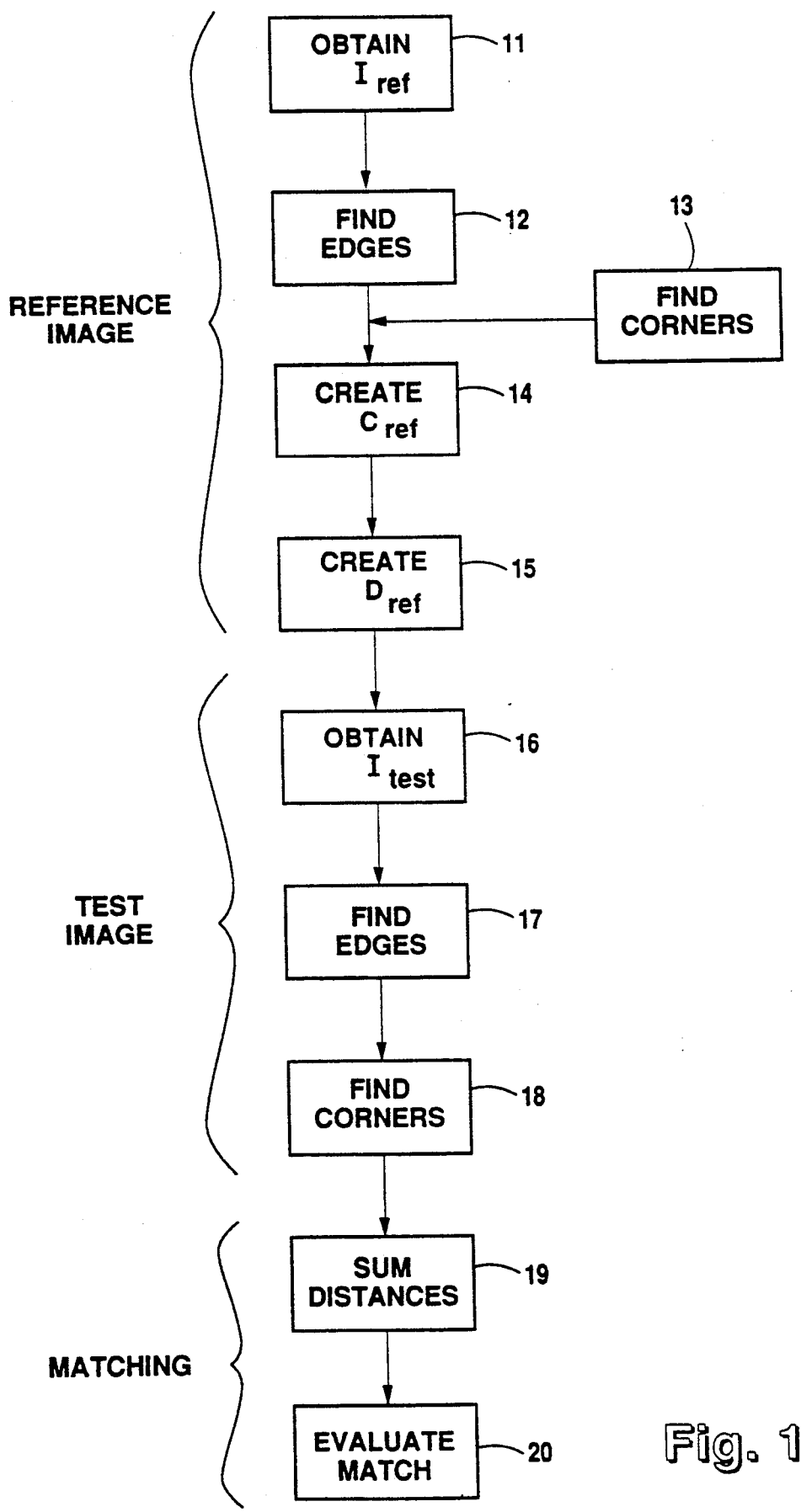
FIG. 1 illustrates the steps of the method of the invention.

FIG. 1 illustrates the steps of the method of the invention. Like other image matching methods, the method involves the obtaining of a distance array from a feature array, i.e., a "distance transformation". In general, a distance transformation converts a binary image to a distance image. The binary image consists of feature and non-feature pixels, whereas in the distance image, each non-feature pixel has a value that corresponds to its distance to the nearest feature pixel. After the distance transformation, the image can be seen as a series of distance contours, each contour being all pixels equidistant from the nearest feature.

Although the present invention also, involves a distance transformation, the transformation is derived from corner features. In contrast to other feature matching methods, to obtain the distance array, corners are located and the distances between them computed.

Steps 11–15 of the method involve obtaining a reference image and its distance array. Once the distance array is obtained, steps 16–28 involve obtaining a test image, from which corner data is determined. In steps 19 and 20, this corner data and the distance array are used to evaluate the match between the test image and the reference image.

Step 11 is obtaining a reference image. This step is essentially an image data acquisition step, which may be performed by well known means.

FIG. 2 illustrates a simple reference image 20, which for purposes of example, is a two-dimensional house. The image 20 is within an image frame 21, which may be a pixel screen, a memory array, or a graphic plot. Image frame 21 is treated as an x-y coordinate plane, with each point in the image frame 21 being associated with an x-y location.

Referring again to FIG. 1, step 12 is finding t he edge boundaries of the image 20. FIG. 3 is an edge feature image of the reference image of FIG. 2. Each edge boundary of the house is represented with a 1 value at the appropriate x-y location. All other points of the image are represented with 0 values. The edge feature image is obtained using known feature extraction techniques. As a preparatory step for obtaining edge data, three dimensional images may be converted to two dimensional representations using known techniques.

Step 13 of the method is finding the corners of the edge feature image of FIG. 3. To find the corners, differential geometry techniques are used. A corner is defined as a sharp change in direction of a line. For a straight line, this change in direction may be expressed mathematically as a sharp change in slope. Thus, using calculus, the derivatives of values along a line can be calculated and compared.

More generally, the process of finding a change in direction of a curved line may be expressed in terms of first finding the curvature of the line, and then finding the locations where the derivative of the curvature has a zero value, or the curvature is an extrema. The curvature at any point on a line, $y=f(x)$ is obtained from the following formula:

$$K = \frac{\frac{d^2y}{dx^2}}{\left(\left(1 + \frac{dy}{dx}\right)^2\right)^{3/2}}$$

A corner is indicated where the derivative of the curvature is zero:

$$\frac{dK}{dx} = 0$$

The above operations may be repeated for a set of points representing any edge of the image, to determine all corners around the image boundary.

In the present invention, for finding corners in the edge feature array, row values are represented as $x(t)$ and column values are represented as $y(t)$. Referring, for purposes of example, to the edge feature array of FIG. 3, at $t=0$, $x=9$, assuming a starting location of (9,3). The value of x increases until it reaches 12 at $t=3$, is constant at 12 for $t=4$ and $t=5$, and decreases from 12 to 6 from $t=5$ to $t=11$, is constant again at 6 from $t=11$ to $t=13$, and increases to 9 from $t=14$ to $t=16$. These values of $f=x(t)$ are treated as a curve, which represents the edge boundaries of the image 20. The same process is used to find $f=y(t)$. Then, $$K = \left|\left|\frac{\alpha' \times \alpha''}{||\alpha'||^3}\right|\right|$$

where $\alpha$ is a vector, such that $\alpha = x(t), y(t)$, and has the derivatives:

$$\alpha' = x'(t), y'(t)$$

$$\alpha'' = x''(t), y''(t)$$

The operator "x" indicates a vector cross product and the notation " || " represents the norm of a vector. Again, corners are indicated at those (x,y) locations where the derivative of K is 0.

Figures 4, 5:
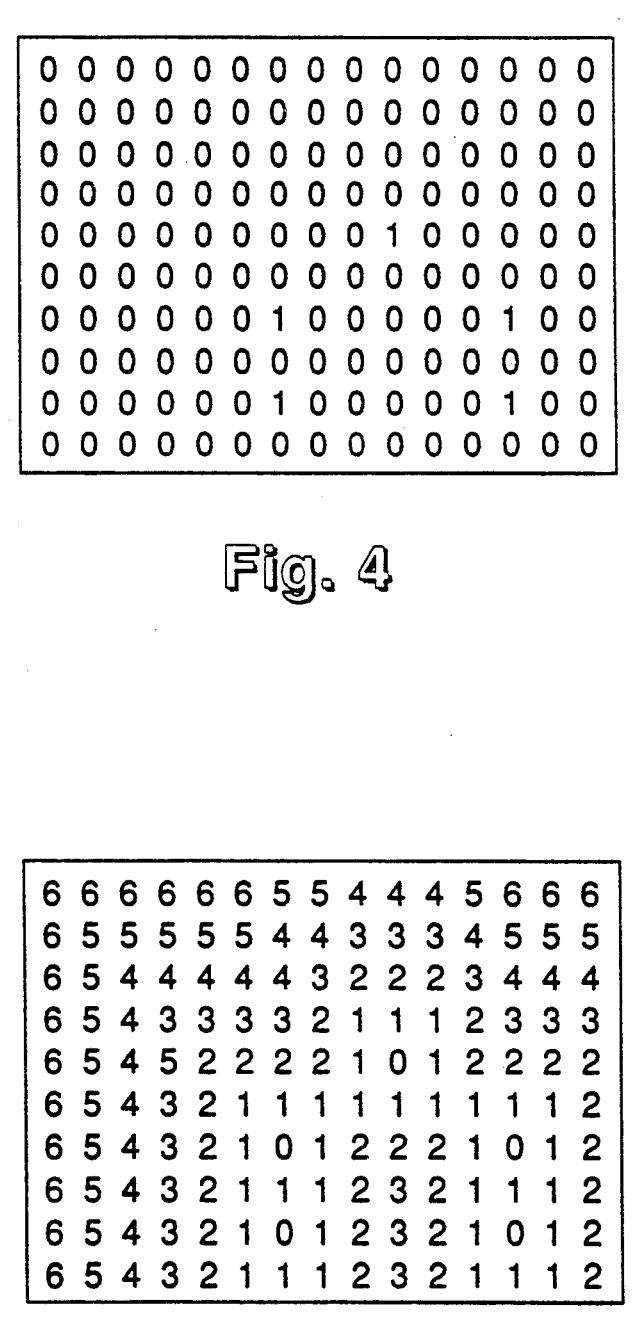

Step 14 is creating a corner array representing the reference image 20. FIG. 4 illustrates a corner array, $C_{ref}$. This corner array is illustrated as a two-valued array, in which 1 values indicate a corner and 0 values otherwise.

Step 15 is creating a distance array, $D_{ref}$, which represent the distance of each location in the image frame from the nearest corner. FIG. 5 illustrates an example of $D_{ref}$. Each corner has a 0 distance from itself. Other distances are computed using distance transformation array from an edge feature array. Various techniques are described in Borgefors, "Distance Transformations in Digital Images," Computer Vision, Graphics, and Image Processing", Vol. 34, pp. 344-71, 1986. Other distance transformation techniques may result in different distance values than those shown in FIG. 5. It should be understood that various distance transformations may generate different values that fill in the distance array; the values of FIG. 5 are for purposes of example only and may not be the best values for indicating a good match.

In the preferred embodiment, the distance array is obtained using a distance transformation technique known as "chamfering". This method, as applied to obtaining a distance array from an edge feature array is described in Barrow, et al., "Parametric Correspondence and Chamfer Matching: Two new Techniques for Image Matching", Proceeding from the International Joint Conference on Artificial Intelligence", Cambridge, Mass., pp. 659-66, 1977.

As applied to the present invention, the chamfer technique determines distance values in two passes of a mask through an initialized corner array. This initialized corner array is two-valued: 0 for corner locations and a large value otherwise. For purposes of example, the large value is 255, for 8-bit calculations.

Figure 6A:
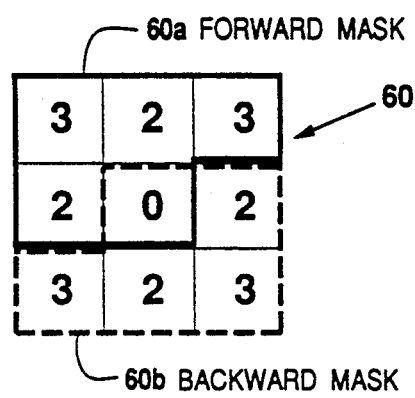
FIGS. 6A and 6B illustrate an example of a mask, used to generate values to fill the distance array.
Figure 6B:
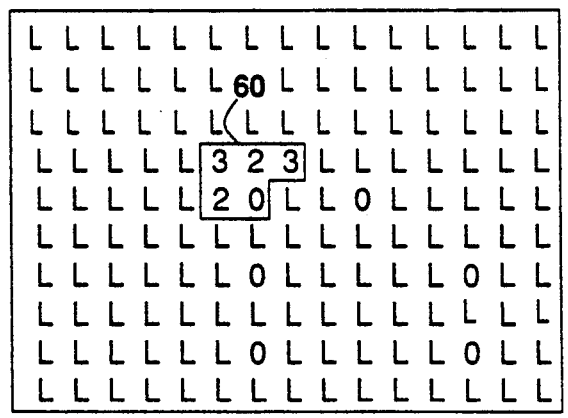

FIG. 6A illustrates an example of a mask 60, which, in other applications, may be referred to as a "template", "window", or "filter". Mask 60 is a $3 \times 3$ mask and has local distance values of 0, 2, and 3. The upper left portion is used for the forward pass, and the lower right portion is used for the backward pass. The center of the mask is included in both passes. These masks are passed over the image once each; the forward one from left to right and from top to bottom, and the backward one from right to left and from bottom to top. Each new value of the "center" location is the minimum of its current value and the values of its neighbors with the mask values added. FIG. 6B illustrates the forward mask during a forward pass, prior to the backward pass.

As an example, the algorithm for the forward mask of FIG. 6A is:

```
For i from 2 to M by 1 do
    For j from 2 to N by 1 do
        F(i,j) = min (
                        (F(i,j)
                        F(i,j) + 2
                        F(i − 1, j − 1) + 3
                        F(i, j − 1) + 2
                        F (i + 1, j − 1) + 3
                     )
``` where $M \times N$ is the size of the image frame 21.

Referring again to FIG. 1, step 16 is obtaining the test image. Various known techniques are used to achieve an initial projection of a three-dimensional model to image frame 21 to form a test image. This initial projection may be adjusted during the matching process, and more than one matching attempt be performed to accommodate different orientations and distances in the test image and the reference image.

Step 17 is finding the edges of the test image. As

Step 18 is using the edges to determine corner locations. The corner finding technique described above in connection with step 13 may be used.

Step 19 is an iterative step that is repeated for each corner of the test image. Each corner is associated with a an x-y location in the image frame 21. Using the distance array, $D_{ref}$, as a look-up table, each corner location is matched to a distance value in the distance array. These distance values are summed for all corners. This step may be expressed mathematically as follows:

$$\text{Sum} = \sum_{i=1}^{n} D_{ref}(x_i, y_i)$$

where n is the number of corners in the test image, and each $(x_i, y_i)$ is a value at a location in the distance array.

Step 20 is evaluating the results of step 19 to determine whether the match is good. For each corner, the lower the distance value obtained in step 19, the better the match for that corner. For determining the best overall match, the distances are summed, with a lower sum indicating a better match. Ideally, the sum is 0, which means that each corner of the test image corresponds to a corner of the reference image.

As indicated in the background section of this patent application, a number of computer vision applications involve image matching. An obvious use is object recognition, when a known reference object is stored and used to identify unknown test objects. Another use is in stereo images, where the reference image and the test image are two views of the same object from different perspectives. These two views are matched to form a stereo view. A third use is in motion detection and estimation, where the reference image and the test image are two views of the same object at different times. These two views are used to determine the motion of the object. Other matching applications are possible, such as image-map applications.

Figure 7:
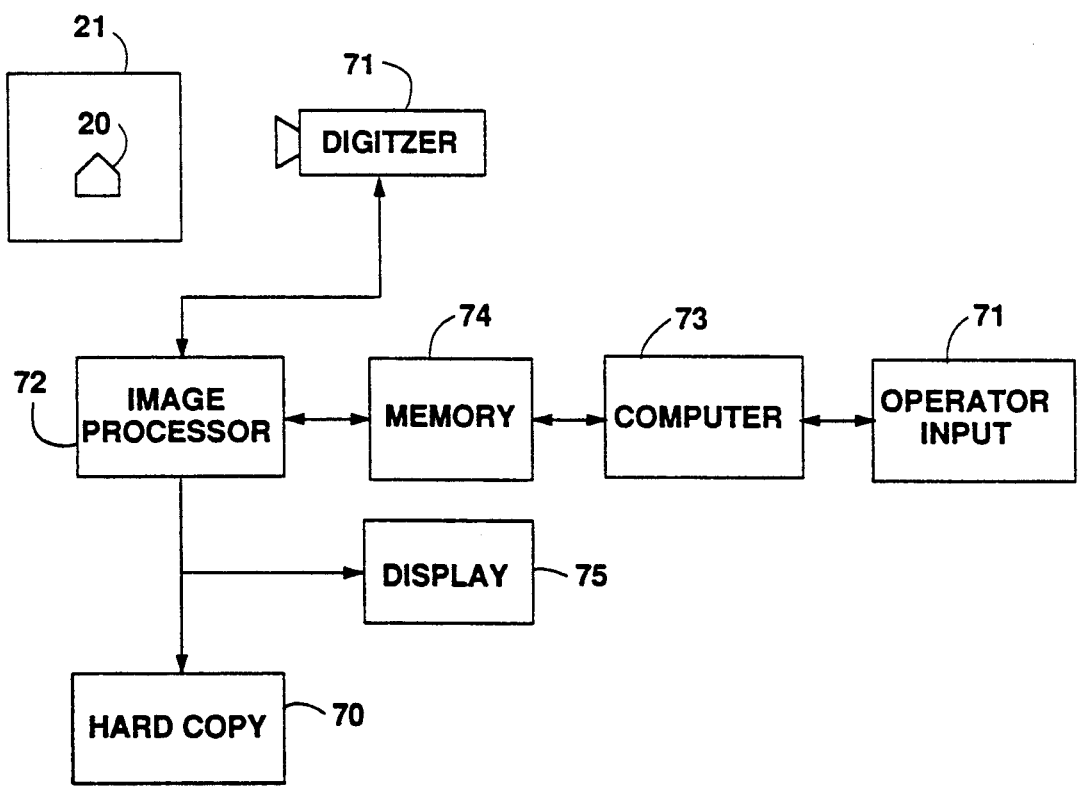
FIG. 7 is a block diagram of an image processing system, which may be used to implement the method of the invention.

FIG. 7 is a block diagram of an image processing system, which may be used to implement the method of the invention. An image 20 in an image frame 21 is acquired with a digitizer 71. The image data is delivered to an image processor 72, which is programmed to create a distance array from a reference image, and to match test images to the reference image, using the corner-based matching process described above. Although FIG. 7 illustrates all of these processing steps being performed by a single image processor, it is possible that certain steps could be performed by different logic and computing devices. A computer 73 performs other processing operations, such as input and output control. Both image processor 72 and computer 73 have access to a memory 74. The images generated by the image processor 72 may be displayed on display 75 or printed out using hard copy equipment 77. The system is interactive with an operator, using an input device 77.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of matching a test image to a reference image, comprising the steps of:
   determining the edge boundaries of a reference image;
   determining corners of said edge boundaries of said reference image;
   calculating a distance array, representing distances of each array location to the nearest of said corners;
   determining the edge boundaries of a test image;
   determining corners of said edge boundaries of said test image;
   using said distance array to determine the test distance of each corner of said test image from a corner of said reference image; and
   evaluating said test distances to determine the degree of matching between said reference image and said test image.

2. The method of claim 1, wherein said evaluating step comprises calculating the sum of said test distances.

3. The method of claim 1, wherein said steps of determining corners comprises calculating the curvature of said edge boundaries.

4. The method of claim 3, wherein said curvature is calculated by means of derivatives of tangents of points along said edge boundaries.

5. The method of claim wherein said step of calculating a distance array comprises using a mask, passed over an array of said corner locations, to determine relative distances of neighboring array locations.

6. The method of claim 5, wherein said mask is passed forward over said corner array and backward over said corner array.

7. The method of claim 1, and further comprising the step of adjusting the orientation of said test image and repeating said steps of determining edge boundaries, corners, and test distances.

8. The method of claim 1, wherein said reference image and said test image are stereo views of an object, and further comprising the step of using the results of said evaluation step to determine a stereo image.

9. The method of claim 1, wherein said reference image and said test image are two views of the same object at different times, and further comprising the step of using the results of said evaluation step to determine motion of said object.

10. An image processing system for applications that require matching one image to another, comprising:
    a processor for matching a reference image to a test image, said processor being programmed to perform the following steps:
    determining the edge boundaries of a reference image;
    determining corners of said edge boundaries of said reference image;
    calculating a distance array, representing distances of each array location to the nearest of said corners;
    determining the edge boundaries of a test image;
    determining corners of said edge boundaries of said test image;
    using said distance array to determine the test distance of each corner of said test image from a corner of said reference image; and
    evaluating said test distances to determine the degree of matching between said reference image and said test image; and
    a memory for storing instructions and data used by said processor.

11. The image processing system of claim 10, wherein said processor is further programmed to use the results of said evaluation step to detect motion.

12. The image processing system of claim 10, wherein said processor is further programmed to use the results of said evaluation step to produce a stereo image.

13. A method of using a computer to process a reference image to be matched to subsequently acquired test images, comprising the steps of:

determining the edge boundaries of a reference image;

determining corners of said edge boundaries of said reference image;

calculating a distance array, representing distances of each array location to the nearest of said corners; and storing said distance array as a look-up table image for use in determining the distances of corners of other images from corners of said reference image.

14. The method of claim 13, wherein said step of determining corners comprises calculating the curvature of said edge boundaries.

15. The method of claim 14, wherein said curvature is calculated by means of derivatives of tangents of points along said edge boundaries.

16. The method of claim 13, wherein said step of calculating a distance array comprises using a mask, passed over an array of said corner locations, to determine relative distances of neighboring array locations.

17. The method of claim 16, wherein said mask is passed forward over said corner array and backward over said corner array.

* * * * *